No. 731,677. PATENTED JUNE 23, 1903.
C. GROTZ.
RUBBER TIRE.
APPLICATION FILED APR. 30, 1903.
NO MODEL.
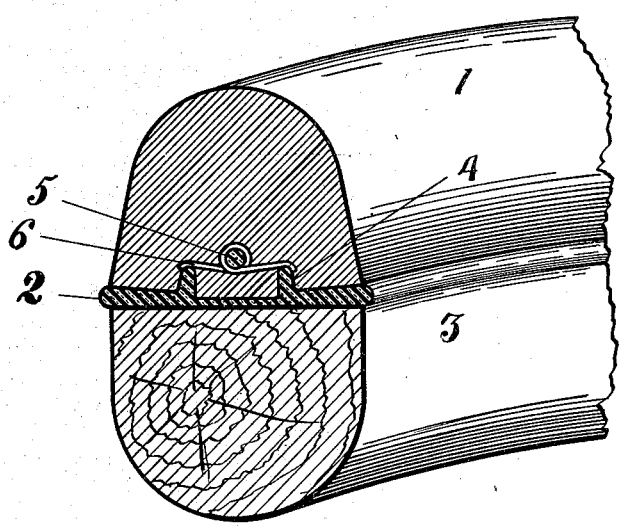
Witnesses:
Maude Zwisler.
Walter Bowman.
Inventor:
Christian Grotz.
By C. E. Humphrey.
Attorney.

No. 731,677.

Patented June 23, 1903.

UNITED STATES PATENT OFFICE.

CHRISTIAN GROTZ, OF AKRON, OHIO.

RUBBER TIRE.

SPECIFICATION forming part of Letters Patent No. 731,677, dated June 23, 1903.

Application filed April 30, 1903. Serial No. 154,965. (No model.)

*To all whom it may concern:*

Be it known that I, CHRISTIAN GROTZ, a citizen of the United States, residing at Akron, in the county of Summit and State of Ohio, have invented a certain new and useful Improvement in Rubber Tires, of which the following is a complete specification.

My invention relates to a combined metallic and elastic tire for vehicles.

The objects of my invention are to so construct a tire for vehicles wherein a metallic tire is combined with an elastic cushion of some substance affording great resiliency in such manner that the metallic portion of the tire will serve to assist and retain the elastic portion in proper position and afford a seat therefor and in which the elastic tire will serve to prevent the contact of the iron tire with the ground and one in which means inclosed within the body of the elastic tire will serve to assist in retaining it in proper place upon the metallic tire.

Another object is to produce a combined metallic and elastic tire in which the ordinary side flanges may be dispensed with and still produce a tire in which the seating and retaining of the elastic portion can be accomplished readily and with such firmness that it will be substantially impossible to remove the elastic portion from the metallic portion unintentionally.

To the accomplishment of the aforesaid objects my invention consists in the peculiar and novel construction, arrangement, and combination of the various parts hereinafter described and then specifically claimed, reference being had to the accompanying drawing, forming a part hereof.

In the drawing, which represents a cross-sectional view of my improved tire, 1 is the rubber tire, in the base of which are two channels or grooves and through the lower central portion and slightly above the channels just described is an opening for the insertion of a longitudinal wire 5. The rubber or elastic tire is adapted to seat on a peculiarly-shaped metallic tire, which has a flat bottom or base to rest on the wooden felly 3, and the outer side edges of this metallic tire are rounded and the upper face is slightly dished or downwardly sloping toward the transverse center of the tire. On either side of the transverse center of the metallic tire are two ridges 4, made integral with the main portion of the metallic tire and rising slightly therefrom. Between these ridges 4 the tire is cut away, and its vertical diameter is lessened and is considerably thinner than the portions of the tire outside of the ridges 4.

In constructing this combined tire the metallic tire 2 is shrunk onto the felly 3 or retained thereon by any of the ordinary means for retaining metallic tires in place. The elastic tire, through which has been placed a longitudinal wire 5, is then wrapped about the metallic tire in such a position that the grooves in the base portion of the elastic tire will inclose the ridges 4 on the metallic tire. The ends of the longitudinal wire 5 are brought together and united by brazing or otherwise, and the elastic tire 1 is slipped over the joint formed by this brazing, and the ends are united by cement or any other means preferred.

In constructing the elastic tire I embed in the body, at intervals varying from one to two inches, transverse wires 6, the ends of which are intended to extend transversely far enough to reach the upper portions of the channels cut in the base of the elastic tire and to rest upon the ridges 4 on the metallic tire when the two tires are united. Between the ends of the transverse wires 6 they are intended to inclose by one or more convolutions the opening formed in the elastic tire for the reception of the longitudinal wire 5, so that the inward pressure of the longitudinal wire, which results from drawing it tightly while placing the elastic tire in position, is borne or sustained to a certain extent upon the transverse wires 6 and from them distributed onto the ridges 4 of the metallic tire.

It will be noticed that the inclined outer sides of the elastic tire do not quite reach the outer edge of the metallic tire 2. This is done for the purpose of protecting the sides of the elastic tire from abrasions in crossing street-car tracks and similar obstructions met with in the use of vehicle-wheels.

It will be noticed in the construction of this tire that a comparatively large amount of elastic material is left around the longitudinal wire 5, and thus the danger that the wire 5 will tear out of its seat in the elastic tire is substantially done away with.

What I claim, and desire to secure by Letters Patent, is—

1. A combined metallic and elastic tire consisting of a comparatively flat metallic tire provided with ridges projecting therefrom and extending circumferentially thereto in combination with an elastic tire to inclose said metallic tire and ridges and rest thereon, of a longitudinal wire arranged to be embedded in said elastic tire and transverse wires embedded in said elastic tire arranged to inclose said longitudinal wire and to be supported by the ridges of said metallic tire.

2. The combination in a tire of the class stated of a comparatively flat metallic tire with circumferential ridges thereon, an elastic tire to rest on said metallic tire and inclose said ridges, a longitudinal wire adapted to pass through said elastic tire, transverse wires adapted to form one or more convolutions about said longitudinal wire and to engage with its ends the upper portions of said ridges.

3. The combination in a tire of the class designated involving an elastic tire, a longitudinal wire embedded therein, ridges projecting from a metal tire forming a base for said elastic tire and transverse wires adapted to be connected with said longitudinal wire and be sustained by said ridges.

4. A combined metallic and elastic tire consisting of a comparatively flat metallic tire, two ridges projecting therefrom and extending circumferentially around said tire, an elastic tire to embrace said ridges, a longitudinal wire embedded in said elastic tire slightly above and centrally between said ridges and transverse wires resting on the tops of said ridges and forming one or more convolutions about said longitudinal wire, substantially as shown and described.

In testimony that I claim the above I hereunto set my hand in the presence of two subscribing witnesses.

CHRISTIAN GROTZ.

In presence of—
C. E. HUMPHREY,
MAUDE ZWISLER.